United States Patent [19]

Matsumura et al.

[11] Patent Number: 4,673,720
[45] Date of Patent: Jun. 16, 1987

[54] ELECTROCONDUCTIVE POLYMER AND PROCESS FOR PREPARATION THEREOF

[75] Inventors: Kiichiro Matsumura; Akio Takahashi; Jun Tsukamoto, all of Otsu, Japan

[73] Assignee: Director-General of Agency of Industrial Science and Technology, Tokyo, Japan

[21] Appl. No.: 520,197

[22] Filed: Aug. 4, 1983

[30] Foreign Application Priority Data

Aug. 7, 1982 [JP] Japan ................................ 57-136831
Aug. 7, 1982 [JP] Japan ................................ 57-136832
Jan. 27, 1983 [JP] Japan .................................. 58-10514

[51] Int. Cl.$^4$ ........................ C08F 38/00; H01B 1/00; H01B 1/06
[52] U.S. Cl. .................................. 526/285; 526/292.8; 526/341; 526/300; 252/500; 252/512; 252/518; 252/521

[58] Field of Search ................ 252/500, 518; 526/285, 526/292.8, 341, 300; 264/29.1, 29.5, 29.7

[56] References Cited

U.S. PATENT DOCUMENTS 4,456,548  6/1984  Lewis et al. ......................... 252/500
4,519,939  5/1985  Hocher et al. ....................... 526/285
4,556,507 12/1985  Tomibe et al. ....................... 252/518
4,556,508 12/1985  Tomibe et al. ....................... 252/518

Primary Examiner—Josephine L. Barr
Attorney, Agent, or Firm—Cushman, Darby & Cushman

[57] ABSTRACT

An insoluble infusible electroconductive polymer is provided, which is derived from an organic compound having 3 to 6 carbon atoms and having a cyano group and an ethylenically or acetylenically unsaturated bond by mutually reacting this compound at an elevated temperature.

13 Claims, 3 Drawing Figures

ELECTROCONDUCTIVE POLYMER AND PROCESS FOR PREPARATION THEREOF

BACKGROUND OF THE INVENTION

1. Field of the Invention

This invention relates to an electroconductive polymer and a process for the preparation thereof.

2. Description of the Prior Art

Carbonaceous electroconductive materials can be prepared according to various processes. Gas phase thermal decomposition is considered to be one of important processes, and various methods have heretofore been proposed on this gas phase thermal decomposition. For example, there have been proposed methods in which methane, propane, propylene, benzene, acetylene and the like are thermally decomposed at high temperatures to prepare carbonaceous electroconductive materials. In these methods, the reaction temperatures are ordinarily high and in the range of from 900° to 2,500° C. Accordingly, in these methods, a large quantity of energy is inevitably consumed. Furthermore, the products obtained by these methods have a relatively low electroconductivity.

SUMMARY OF THE INVENTION

It is a primary object of the present invention to provide an electroconductive polymer that can be prepared by conducting the polymerization at a relatively low temperature.

Other objects and advantages of the present invention will become apparent from the description given hereinafter.

In accordance with one aspect of the present invention, there is provided an insoluble infusible electroconductive polymer derived from an organic compound having 3 to 6 carbon atoms and having a cyano group and an ethylenically or acetylenically unsaturated bond.

In accordance with another aspect of the present invention, there is provided a process for the preparation of an electroconductive polymer, which comprises mutually reacting an organic compound having 3 to 6 carbon atoms and having a cyano group and an ethylenically or acetylenically unsaturated bond at a temperature of at least 150° C.

In accordance with still another aspect of the present invention, there is provided a process for the preparation of an electroconductive polymer, which comprises mutually reacting an organic compound having 3 to 6 carbon atoms and having a cyano group and an ethylenically unsaturated bond at a temperature of at least 500° C.

PREFERRED EMBODIMENTS OF THE INVENTION

Figure 1:
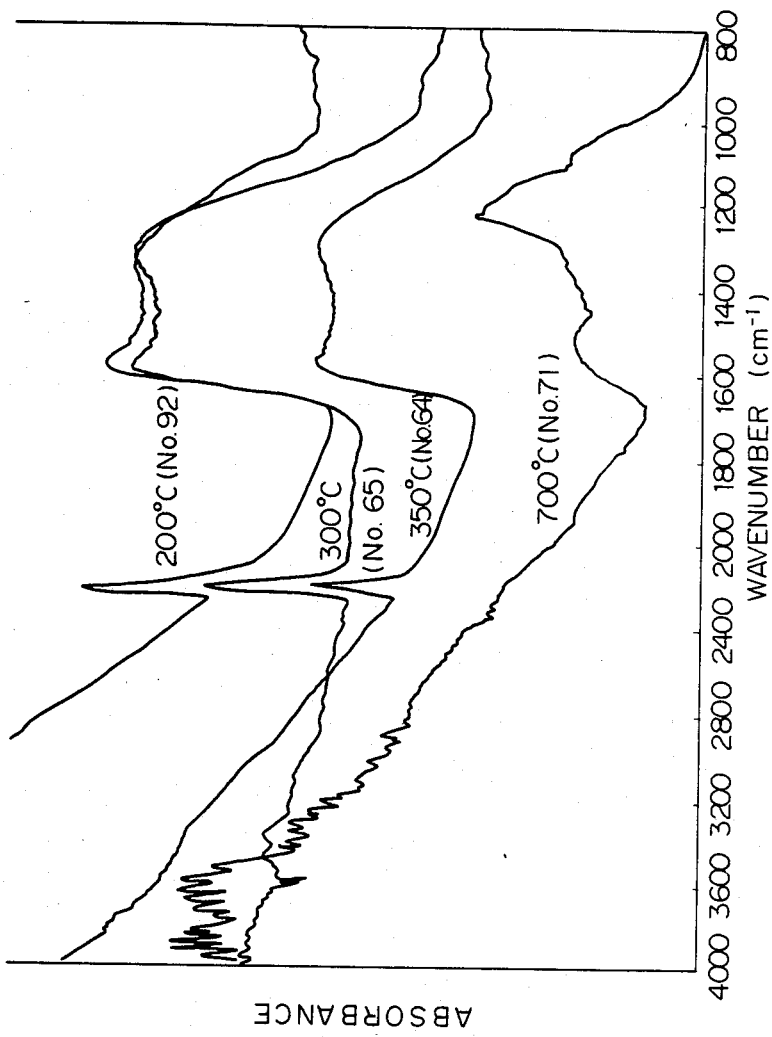
FIG. 1 is IR spectra of polycyanoacetylene prepared by the process of the present invention.

The starting material for use in the production of an electroconductive polymer in the present invention is an organic compound having 3 to 6 carbon atoms and having a cyano group and an ethylenically or acetylenically unsaturated bond. More specifically, there can be mentioned hydrocarbons having a cyano group and a carbon-to-carbon triple bond (acetylenically unsaturated bond), such as cyanoacetylene and dicyanoacetylene, and organic compounds having a cyano group and a carbon-to-carbon double bond (ethylenically unsaturated bond), which are represented by the following general formula:

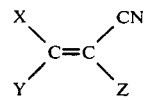

wherein X, Y and Z independently stand for a hydrogen atom, a halogen atom, a cyano group or an alkyl group, such as acrylonitrile, methacrylonitrile, tetracyanoethylene and chloroacrylonitrile. Among these compounds, cyanoacetylene and dicyanoacetylene are most preferred.

These compounds may be used singly or in the form of a mixture of two or more of them. Furthermore, these compounds may be used in the form of a mixture with an inert gas such as nitrogen, helium, argon or hydrogen, or an aliphatic hydrocarbon, an alicyclic hydrocarbon, an aromatic hydrocarbon, an unsaturated hydrocarbon or other hydrocarbon. These compounds may also be used either vapor or liquid state. When these compounds are used singly in vapor state, the vapor pressure can be varied over a wide range, namely, from 1 mmHg or less to 760 mmHg or more. When the compounds are used in the state diluted with an inert gas, the compound may be diluted so that the concentration is ordinarily 3 to 40% and preferably 10 to 30%.

A gas containing the compound having a cyano group and an acetylenically unsaturated bond is reacted at a temperature of 150° to 3,400° C., preferably 350° to 3,200° C. The reaction is preferably carried out in two stages. Namely, in the first stage, the reaction is carried out at a relatively low temperature up to about 1,600° C., and, in the second stage, the reaction product is heat-treated at a temperature higher than the first stage temperature. The temperature in the second stage can be higher than 2,500° C. The reaction time in the first stage differs according to other reaction conditions. For example, if the reaction temperature is about 600° C., a reaction time of about 30 seconds is sufficient. However, the reaction time is not particularly critical. The heat-treatment time can be varied over a wide range, namely, from 1 to 90 minutes or more. Usually, the second stage heat-treatment can be carried out in an inert gas atmosphere such as nitrogen or argon.

It is considered that the polymerization is advanced through various mechanisms. For example, at low temperatures, it is considered that the triple bond of the acetylene group will probably be opened to form a hydrocarbon having a conjugated double bond and then, the triple bond of the cyano group will probably be opened to form a ring-closed compound. It also is considered that with elevation of the temperature, dehydrogenation cyclization and other reactions will take place in a complicated manner and at further elevated temperatures, particularly in the second stage, graphitization will take place. Furthermore, there may occur reactions through cleavage to ions or other radicals. It is considered that the reaction product is ordinarily a composition of polymers differing in the structure, though the reaction product varies depending upon the reaction conditions.

The compound having a cyano group and an ethylenically unsaturated bond is reacted at 500° to 3,400° C., preferably 600° to 3,200° C., more preferably 700° to 1,500° C. The reaction is preferably carried out in two stages. Namely, in the first stage, the reaction is carried out at a relatively low temperature up to about 1,600° C., and, in the second stage, the reaction product is heat-treated at a temperature higher than the first stage temperature. The temperature in the second stage can be higher than 2,500° C. The reaction time in the first stage is not particularly critical and varies depending upon the reaction conditions. For example, when the reaction temperature is about 700° C., a reaction time of about 50 seconds is sufficient. The heat-treatment time can be varied over a wide range, namely, from 1 to 90 minutes or more. Usually, the second stage heat-treatment can be carried out in an inert gas atmosphere such as nitrogen or argon.

It is considered that the reaction of the compound having a cyano group and an ethylenically unsaturated bond also is advanced through various mechanisms. For example, at first, the double bond is opened and cyclization is then caused by ring closure of the cyano group, and with elevation of the reaction temperature, dehydrogenation cyclization and other reactions take place in a complicated manner. At higher temperatures, particularly in the second stage, it is considered that graphitization will be advanced. Furthermore, reactions through cleavage to ions or other radicals may occur. It is considered that the reaction product is ordinarily a composition of polymers differing in the structure, though the reaction product varies depending upon the reaction conditions.

According to the process of the present invention, a nitrogen-containing novel compound is first formed at a stage of a low temperature. As the reaction temperature is elevated, the nitrogen content is reduced and it is considered that the structure of the reaction product becomes close to a so-called graphite structure. In the process of the present invention, the rate of reaction is higher than in the conventional gas-phase thermal decomposition process for the production of carbon. Accordingly, from the viewpoint of the energy-saving effect, the process of the present invention is industrially advantageous. Furthermore, electroconductivity of the product obtained by the process of the present invention is higher than that of the products obtained by the prior art processes.

In the present invention, the electroconductive polymer can be obtained in the form of a fiber or bulk, but ordinarily, the electroconductive polymer is obtained in the state deposited on or in a substrate.

The electroconductive polymer of the present invention is obtained as a surface-covering layer for a substrate when the polymer is formed in the presence of the substrate. The substrates used include, for example, inorganic materials such as quartz, glass, boron nitride, silicon nitride, sapphire and silicon, metallic materials such as aluminum, stainless steel and copper, and carbonaceous materials such as graphite and carbon fiber. Of course, a crystalline substrate to be ordinarily used for epitaxial polymerization and a substrate to be ordinarily used for graphoepitaxial growth can be used as the substrate in the present invention. Furthermore, when the reaction is carried out at a relatively low temperature, using the organic compound having a cyano group and an acetylenically unsaturated bond, such as cyanoacetylene or dicyanoacetylene, a polymer can be used as a substrate. Various polymers can be used irrespectively of the reaction temperature, so far as the reaction temperature is lower than the decomposition temperatures of these polymers. As the polymer that can be used as the substrate, there can be mentioned, for example, nitrogen-containing polymer containing nitrogen atoms in the molecule, such as polypeptides, polyamides, polyimides, polyazines, polyamines and polyimines, silicon polymers, and sulfone type polymers such as aromatic polysulfones. Heat-resistant polymers such as Torlon (aromatic polyamideimide), Kinel (aromatic polyamideimide), Silicone, Vespel (polyamide) and Kapton (polyimide) are especially preferred. When the polymer is used as a substrate, the reactant can penetrate into the polymer so that electro-conductivity can be bestowed on not only the polymer surface but also the inner portion of the polymer.

Since the reaction temperature can be reduced below softening points of these polymers in the present invention, it is made possible for the first time in the present invention to form flexible electroconductive films of polymers such as mentioned above. Therefore, flexible, electroconductive films can advantageously be prepared according to the present invention. This fact is very significant from the industrial viewpoint.

The shape of the substrate inclusive of a polymer substrate is not particularly critical. For example, a substrate in the form of a film or a fiber or yarn or having other shape can be used. When a polymer is used as the substrate, there may be adopted a method in which a compound having a cyano group and an acetylenically unsaturated bond is mutually reacted in the presence of the polymer in the molten state or in the form of a suspension or solution and the resulting polymer composition is molded into an optional shape.

If the compound having a cyano group and an acetylenically unsaturated bond is thus reacted in the presence of a polymer substrate, an electroconductivity can be advantageously given to the polymer. As means for imparting an electroconductivity, there have heretofore been adopted a method in which a polymer is mixed with carbon black or metal, a method in which a metal is vacuum-deposited on the polymer surface and a method in which a metal is deposited on the polymer by sputtering. However, the first-mentioned method has a problem such that a uniform electroconductivity cannot be expected, because the grain size of carbon black cannot be reduced to a desired small size. The latter two methods have a problem such that the metal coating is readily oxidized and the effect is limited to the surface portion. In contrast, according to the present invention, an appropriate electroconductivity can be imparted to not only the surface portion but also the interior portion of the polymer. Moreover, the conductivity is uniform in not only the surface of the polymer but also the strata parallel to the surface. Furthermore, by appropriately selecting the reaction conditions, the electric conductivity to be imparted to the polymer can freely be controlled to a level suitable for an antistatic material, a level suitable for a semiconductor or a higher level.

If the reaction of the compound having a cyano group and an ethylenically or acetylenically unsaturated bond is carried out in the gas phase in the presence of a substrate such as mentioned above, a reaction product deposited to the substrate can be formed. Furthermore, the reaction may be carried out in the liquid phase comprising water or a hydrocarbon.

In the present invention, the reaction of the compound having a cyano group and an ethylenically or acetylenically unsaturated bond may be carried out in the presence or absence of a catalyst. As the catalyst, there can be used heavy metals such as aluminum, iron, cobalt, nickel and vanadium, and alloys, oxides, carbides and other compounds of these metals. Furthermore, a nitrogen-containing compound such as an amine can be used as the catalyst. A plasma polymerization technique can concurrently be adopted.

The conductivity of the electroconductive polymer composition obtained according to the present invention, particularly by a procedure wherein the reaction product is heat-treated at a temperature higher than 200° C., can be improved by such means as doping and intercalation. As the dopant, there may be used halogens such as bromine and iodine, arsenic heptafluoride, antimony trichloride, alkali metals such as lithium and sodium, $IF_5$, $MgCl_5$, $WCl_6$, nitric acid, sulfuric acid, Na-$NH_3$, K-naphthalene, butyl lithium and other known dopant compounds.

The present invention will now be described in detail with reference to the following examples that by no means limit the scope of the invention.

EXAMPLE 1

A plate of Kapton, a heat-resistant polymer, was placed as the substrate in a quartz reaction tube having an inner diameter of 15 mm, and the plate was heated at 300° C. in an electric furnace, a feed gas comprising nitrogen as a carrier and 13% by volume of cyanoacetylene, dicyanoacetylene, acetylene, benzene, propylene, ethylene, ethylene chloride, methylacetylene, 1,2-dichloroethylene, heptane, propagyl alcohol or octene-1 was separately supplied into the reaction tube at a rate of 100 ml/min for 2 hours. After the reaction, the Kapton plate was taken out and the reaction product was observed with the naked eye. In case of cyanoacetylene or dicyanoacetylene, a reaction product having a metallic luster was formed on the substrate, but in case of other starting compounds, no product was formed.

EXAMPLE 2

Cyanoacetylene was diluted with argon so that the cyanoacetylene concentration was 5%. The thus formed feed gas was supplied at a rate of 50 ml/min and reacted on a quartz plate placed in a reaction vessel maintained at 300°, 700° or 1,000° C. After 2 hours, the quartz plate used as the substrate was taken out, and the product on the substrate was sampled and subjected to the elementary analysis. The obtained results are as follows.

| Reaction Temperature (°C.) | Atomic Ratio | | |
|---|---|---|---|
| | Carbon | Nitrogen | Hydrogen |
| 350 | 4.5 | 1.0 | 1.1 |
| 700 | 5.8 | 1.0 | 0.5 |
| 1,000 | 7.3 | 1.0 | 0.2 |

From the foregoing results, it is seen that at a lower reaction temperature, a product having a high nitrogen content is obtained and with elevation of the reaction temperature, the nitrogen content is reduced.

Infrared spectra of the polymer deposited on sodium chloride and silicon wafer were run by the use of Digilab Inc. FT-IR FTS-20B instrument. The spectra are shown in FIG. 1. The polymers obtained at 200°, 300° and 350° C. have a sharp absorption peak at 2,200 cm$^{-1}$. This absorption can be assigned to nitrile group, although it shifted to somewhat longer wavelength due to the conjugation of nitrile group with double bonds. The absorption at 2,2000 cm$^{-1}$ decreases with an increase of polymerization temperature, and finally disappears when the polymerization temperature exceeds 700° C.

The broad peaks around 1,000-1,700 cm$^{-1}$ seem to be due to the stretching vibration of carbons in fused rings. The lack of the peak of mono-substituted carbon-carbon triple bond at 2,000-2,100 cm$^{-1}$ even for the product obtained at 200° C. suggests that the polymerization first occurs by way of carbon-carbon triple bond. The product obtained at 1000° C. has a very broad peak ranging 600-4,000 cm$^{-1}$, which is similar to the absorption of carbonized materials.

Figure 2:
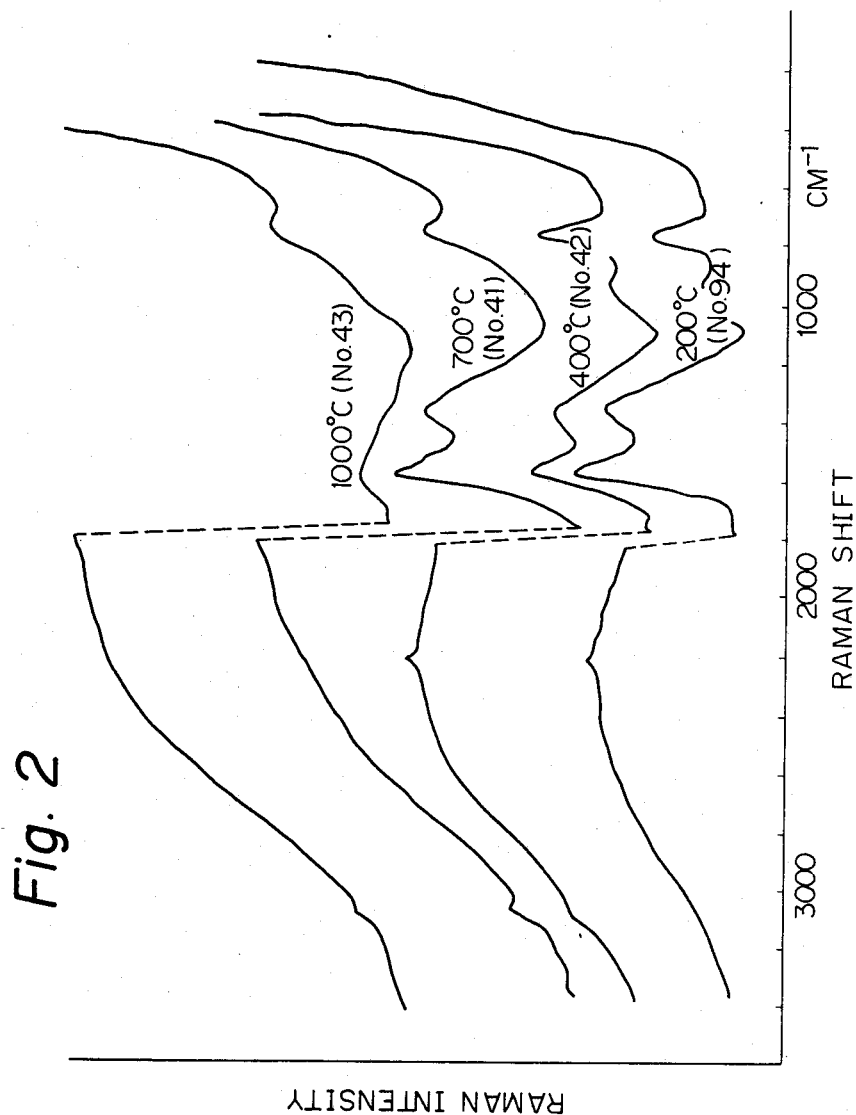
FIG. 2 is Raman spectra of the polycyanoacetylene.

Raman spectra of the polymer were recorded by the use of MOLE of Jobin Yvon. The 4,880 Å line of an $Ar^+$-ion laser was used to induce the Raman spectra. The spectra are shown in FIG. 2. The Raman lines around 700-1,100 cm$^{-1}$ are due to the background of the MOLE system.

Two very diffuse Raman lines are observed in the 1,100-1,800 cm$^{-1}$ region, one being centered at around 1,360 and the other being centered at around 1,580 cm$^{-1}$. The relative intensity of the two lines ($I_{1360}/I_{1580}$) decreases slightly with an increase of polymerization temperature.

Figure 3:
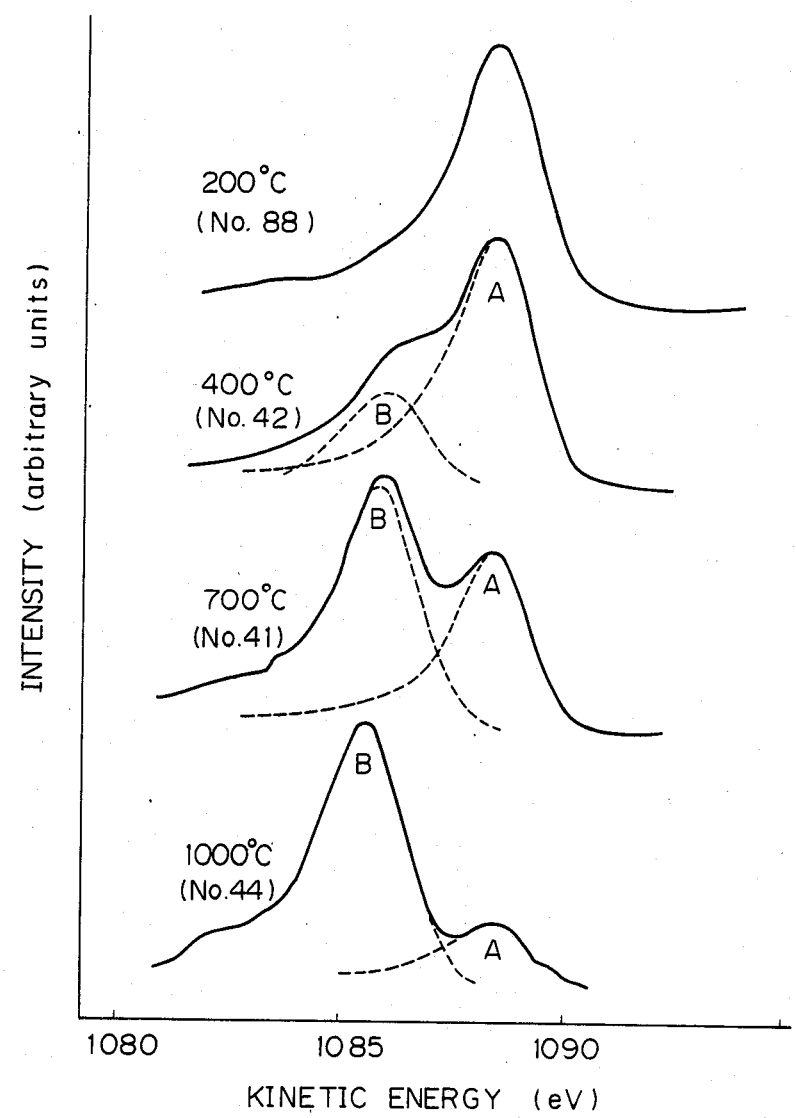
FIG. 3 is ESCA spectra ($N_{1s}$) of the polycyanoacetylene.

ESCA spectra were obtained using an AEI-Kokusai Denki model ES-200 with Alk$\alpha$ X-ray source (h$^\nu$=1486.6 ev) in vacuo of $1\times10^{-8}$ Torr. The nitrogen $N_{1s}$ electron line spectra are shown in FIG. 3. The spectra can be curve resolved in two lines centered around 1087.6 eV (line A) and 1085.7 eV (line B). Line (A) can be assigned to either cyano or naphthyridine nitrogen. According to the IR analyses, cyano radical is not observed in the product obtained at 700° C. and 1000° C. The presence of ESCA line at 1087.6 eV(A) indicates the formation of naphtiridine ring structure in the products obtained at 700°-1000° C.

The conductivity of the product was measured. The obtained results are shown below.

| Reaction Temperature (°C.) | Conductivity at Room Temperature (S/cm) |
|---|---|
| 350 | 0.1 |
| 700 | 91 |
| 1,000 | 1,600 |

The product obtained at 700° C. was heat-treated at 3,000° C. in an argon atmosphere for 60 min. The room temperature conductivity of the heat-treated product was $1.0\times10^4$ S/cm. This heat-treated product was doped with nitric acid by exposing the product to concentrated nitric acid at a room temperature for 60 min. The conductivity of the doped product was $1.5\times10^5$ S/cm.

EXAMPLE 3

A heat-resistant polymer film, Kapton, Ryton, Tolon or Ekonol, was placed in a quartz reaction tube and the pressure was reduced. The polymer film was heated at 150° C. Cyanoacetylene was charged in the reaction tube and then reacted under a pressure of 410 mmHg for 3 hours.

A cyanoacetylene reaction product having a golden color was formed in the form of a thin film on each substrate film.

EXAMPLE 4

The inner surface of a reaction tube of alumina having an inner diameter of 20 cm was coated with ferric sulfate. The temperature was elevated to 1,000° C. and a gaseous mixture of cyanoacetylene (90% by volume) and hydrogen was caused to flow in the reaction tube at a rate of 10 cm/min for 2 hours. After the reaction the interior of the reaction tube was observed. It was found that whiskers having a length of about 15 cm were densely formed.

EXAMPLE 5

A quartz plate was placed as the substrate in a quartz reaction tube having an inner diameter of 15 mm, and the plate was heated at 600° C. by an electric furnace. A feed gas comprising nitrogen gas as a carrier gas and 20% by volume of acrylonitrile, methacrylonitrile, tetracyanoethylene, methane, propylene, acetylene, n-heptane, benzene, acetonitrile, diethylene triamine, 2-vinylpyridine or chloroacrylonitrile was separately supplied at a rate of 100 ml/min. The quartz plate used as the substrate was taken out and the reaction product was observed with the naked eye. In case of acrylonitrile, methacrylonitrile, tetracyanoethylene and chloroacrylonitrile, a reaction product having a metallic luster was formed on the substrate, but in case of the other compounds, no surface-covering layer was formed.

EXAMPLE 6

Acrylonitrile was diluted with argon so that the argon concentration was 5%. The thus-formed feed gas was supplied at a rate of 50 ml/min and reacted on a quartz plate placed in a reaction tube maintained at a temperature of 600°, 800° or 1,500° C. After 1 hour, the quartz plate used as the substrate was taken out, and the reaction product on the substrate was sampled and subjected to the elementary analysis. The obtained results are shown below.

| Reaction Temperature (°C.) | Atomic Ratio | | |
|---|---|---|---|
| | Carbon | Nitrogen | Hydrogen |
| 600 | 5.5 | 1.0 | 0.6 |
| 800 | 6.8 | 1.0 | 0.4 |
| 1,500 | 8.3 | 1.0 | 0.1 |

From the foregoing results, it is seen that at a lower reaction temperature, a product having a higher nitrogen content is obtained.

The conductivity of the reaction product was measured. The obtained results are shown below.

| Reaction Temperature (°C.) | Conductivity at Room Temperature (S/cm) |
|---|---|
| 600 | 0.02 |
| 800 | 80 |
| 1,500 | 900 |

EXAMPLE 7

A ceramic boat coated with ferrous oxide was placed in a reaction tube having an inner diameter of 20 cm and the temperature was elevated to 1000° C. Acrylonitrile was supplied at a rate of 15 cm/min and reacted for 2 hours. After the reaction, the ceramic boat was taken out and observed. It was found that whiskers having a length of about 6 mm were densely formed.

EXAMPLES 8 through 15

A glass reaction tube having an inner diameter of 40 mm was charged with a film having a size of 7 mm × 15 mm, which was composed of "Kapton", nylon-6, "Tetorlon", silicone rubber, polypropylene, polyvinyl chloride, polyethylene, polymethoxymethylated nylon-6, "Kevlar" (aromatic polyester), polydimethylpiperazine isophthalamide, polytrimethylethanolamine chloride methacrylic acid ester, polysulfone, ethyl cellulose or poly-p-phenylene sulfide. The temperature was elevated to 100° C. by using an oil bath under vacuum evacuation, monomeric cyanoacetylene was supplied under 410 mmHg and reaction was carried out for 8 hours.

After the reaction, the film was taken out, and the reaction product was observed with the naked eye and subjected to the IR analyses. In case of each of "Kapton", nylon-6, silicone rubber, polymethoxymethylated nylon-6, "Kevlar", polydimethylpiperazine isophthalamide, polytrimethylethanolamine chloride methacrylic acid ester and polysulfone, a brown to black reaction product having a cyano group (confirmed by the IR analyses) was formed. The sample was cut by a knife and the section was observed by a microscope. It was found that the reaction product was present even in the interior of the film. In case of other films, no reaction product was formed. The electric resistance of the film containing the formed reaction product was measured. The obtained results are shown in Table 1. It is seen that the electric resistance is prominently reduced by the reaction.

TABLE 1

Surface Resistances of Various Films (Cyanoacetylene Polymerization Temperature: 100° C.)

| Example No. | Substrate | Surface Resistance ($\Omega/\square$) | |
|---|---|---|---|
| | | Before polymerization | After polymerization |
| 8 | "Kapton" (polyimide) | $10^{19}$ | $5 \times 10^{11}$ |
| 9 | polytrimethylethanolamine chloride methacrylic acid ester | $10^{17}$ | $5 \times 10^{10}$ |
| 10 | polydimethylpiperazine isophthalamide | $10^{17}$ | $2 \times 10^9$ |
| 11 | nylon-6 (terminal NH$_2$ group concentration: $10 \times 10^{-5}$ mole/g) | $10^{17}$ | $2 \times 10^9$ |
| 12 | polymethoxymethylated nylon-6 | $10^{18}$ | $2 \times 10^{10}$ |
| 13 | "Kevlar" | $10^{19}$ | $5 \times 10^9$ |
| 14 | polysulfone | $10^{19}$ | $7 \times 10^{10}$ |
| 15 | silicone rubber | $10^{17}$ | $4 \times 10^{10}$ |

Note
The surface resistance was measured in vacuo according to the two-terminal method using an ultra insulation resistance meter (Model TR-8601 supplied by Takeda Riken K.K.).

EXAMPLES 16 through 20

Cyanoacetylene was reacted at room temperature in the same manner as described in Example 8. In case of each of "Kapton", nylon-6, silicone rubber, polymethoxymethylated nylon-6, "Kevlar", polydimethylpiperazine isophthalamide and polytrimethylethanolaminde chloride methacrylic acid ester, a brown to black reaction product having a cyano group was formed on the film.

The electric resistance of the film was measured. The obtained results are shown in Table 2. It is seen that the electric resistance is prominently reduced by the reaction.

TABLE 2

Surface Resistances of Various Films (Cyanoacetylene Polymerization Temperature: 28° C.)

| Example No. | Substrate | Surface Resistance ($\Omega/\square$) | |
|---|---|---|---|
| | | Before polymerization | After polymerization |
| 16 | "Kapton" (polyimide) | $10^{19}$ | $7 \times 10^{10}$ |
| 17 | polytrimethylethanolamine chloride methacrylic acid ester | $10^{17}$ | $1 \times 10^{9}$ |
| 18 | polydimethylpiperazine isophthalamide | $10^{17}$ | $2 \times 10^{7}$ |
| 19 | nylon-6 (terminal $NH_2$ group concentration: $10 \times 10^{-5}$ mole/g) | $10^{17}$ | $3 \times 10^{9}$ |
| 20 | nylon-6 (terminal) $NH_2$ group concentration: $3.5 \times 10^{-5}$ mole/g) | $10^{18}$ | $1 \times 10^{9}$ |

Note
The surface resistance was measured under the same conditions as described in Table 1.

We claim:

1. A process for the preparation of an electroconductive polymer, which comprises heating cyanoacetylene or dicyanoacetylene in a gas phase at a temperature of at least 150° C. to about 3,400° C. and a vapor pressure of 1 mmHg to 760 mmHg in the presence of a heat resistant substrate whereby the cyanoacetylene or dicyanoacetylene is polymerized and carbonized on the substrate.

2. A process for the preparation of an electroconductive polymer, which comprises heating a monoethylenically unsaturated compound represented by the following general formula:

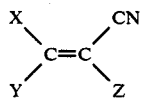

wherein X, Y and Z are selected from the group consisting of a hydrogen atom, a halogen atom and an alkyl group, in the gas phase at a temperature of at least 500° C. to about 3,400° C. and a vapor pressure of 1 mmHg to 760 mmHg in the presence of a heat resistant substrate whereby the monoethylenically unsaturated compound is polymerized and carbonized on the substrate.

3. A process according to claim 1, wherein the heating is carried out at a temperature between 150° C. and 1,600° C., and thereafter at a temperature above 2,500° C.

4. A process according to claim 1, wherein cyanoacetylene or dicyanoacetylene in the gas phase is heated in an inert gas at a compound concentration of 3 to 40%.

5. A process according to claim 1, wherein the substrate is a heat-resistant polymer.

6. A process according to claim 5, wherein the heat-resistant polymer is a member selected from the group consisting of polyamides, polyimides and polyamideimides.

7. A process according to claim 1, wherein the polymer obtained by the heating is doped.

8. A process according to claim 7, wherein the polymer is doped with a dopant selected from the group consisting of halogens, arsenic heptafluoride, antimony trichloride, alkali metals, $IF_3$, $MgCl_5$, $WCl_6$, nitric acid, sulfuric acid, Na-$NH_3$, K-naphthalene and butyl lithium.

9. A process according to claim 2, wherein the heating is carried out at a temperature between 500° C. and 1,600° C. and thereafter at a temperature above 2,500° C.

10. A process according to claim 2, wherein the monoethylenically unsaturated compound is selected from the group consisting of acrylonitrile, methacrylonitrile, tetracyanoethylene, $\alpha$-chloroacrylonitrile and $\beta$-chloroacrylonitrile.

11. A process according to claim 2, wherein the ethylenically unsaturated compound in the gas phase is heated in an inert gas at a compound concentration of 3 to 40%.

12. A process according to claim 2, wherein the polymer obtained by the heating is doped.

13. A process according to claim 12, wherein the polymer is doped with a dopant selected from the group consisting of halogens, arsenic heptafluoride, antimony trichloride, alkali metals, $IF_3$, $MgCl_5$, $WCl_6$, nitric acid, sulfuric acid, Na-$NH_3$, K-naphthalene and butyl lithium.

* * * * *